US012049233B2

United States Patent
Voyiadjis et al.

(10) Patent No.: US 12,049,233 B2
(45) Date of Patent: Jul. 30, 2024

(54) OVERHEIGHT VEHICLES IMPACT AVOIDANCE AND INCIDENT DETECTION SYSTEM

(71) Applicant: Board of Supervisors of Louisiana State University and Agricultural and Mechanical College, Baton Rouge, LA (US)

(72) Inventors: George Z. Voyiadjis, Baton Rouge, LA (US); Aly Mousaad Aly, Baton Rouge, LA (US); Jin-Woo Choi, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 0 days.

(21) Appl. No.: 16/901,634

(22) Filed: Jun. 15, 2020

(65) Prior Publication Data

US 2020/0391761 A1 Dec. 17, 2020

Related U.S. Application Data

(60) Provisional application No. 62/861,026, filed on Jun. 13, 2019.

(51) Int. Cl.
*B60W 50/14* (2020.01)
*B60W 30/08* (2012.01)
(Continued)

(52) U.S. Cl.
CPC ............ *B60W 50/14* (2013.01); *B60W 30/08* (2013.01); *B60W 40/12* (2013.01);
(Continued)

(58) Field of Classification Search
CPC ...... B60W 50/14; B60W 40/12; B60W 30/08; B60W 2300/12; B60W 2420/42;
(Continued)

(56) References Cited

U.S. PATENT DOCUMENTS

| 6,204,778 | B1* | 3/2001 | Bergan | G08G 1/075 |
| | | | | 340/905 |
| 9,472,103 | B1* | 10/2016 | Baskaran | G08G 1/162 |
| 2019/0129009 | A1* | 5/2019 | Eichenholz | H03K 17/74 |

FOREIGN PATENT DOCUMENTS

| CN | 203489844 U | * | 3/2014 |
| CN | 103116988 B | * | 10/2014 |

(Continued)

OTHER PUBLICATIONS

"The Effect of Filtering on Proximity Sensors", M.S. Thesis by J. Taghipour. California State Polytechnic University, Pomona (Year: 2017).*

(Continued)

*Primary Examiner* — Peter D Nolan
*Assistant Examiner* — Tanya C Sienko
(74) *Attorney, Agent, or Firm* — Thomas | Horstemeyer, LLP

(57) ABSTRACT

A system and method are disclosed for overheight vehicle impact avoidance and incident detection. A detection subsystem of the system determines whether an incoming vehicle is clear to pass, depending at least on its height. The detection subsystem relies on distance sensors located along the freeway to detect the highest point of the vehicle and outputs an indication of whether the vehicle can pass. A warning subsystem receives the indication that a vehicle is overheight and provides a warning indication to the driver about the vehicle's inability to pass an upcoming structure. The warning subsystem may also perform a variety of other tasks, such as, for example, logging a variety of information (Continued)

about the vehicle and the incident, sending data about the incident locally to a central command, and generating reports.

18 Claims, 12 Drawing Sheets

(51) Int. Cl.
  *B60W 40/12* (2012.01)
  *B60W 50/00* (2006.01)
(52) U.S. Cl.
  CPC ............... *B60W 2050/0052* (2013.01); *B60W 2050/0059* (2013.01); *B60W 2050/0075* (2013.01); *B60W 2300/12* (2013.01); *B60W 2420/403* (2013.01); *B60W 2420/408* (2024.01); *B60W 2420/54* (2013.01); *B60W 2530/201* (2020.02); *B60W 2554/20* (2020.02); *B60W 2556/50* (2020.02); *B60W 2556/55* (2020.02)
(58) Field of Classification Search
  CPC ......... B60W 2420/62; B60W 2554/20; B60W 2050/0052; B60W 2050/0059; B60W 2050/0081; B60W 2530/201; B60W 2556/60; B60W 2556/55; B60W 2420/54
  See application file for complete search history.

(56) References Cited

FOREIGN PATENT DOCUMENTS

| GB | 2514127 | A | * | 11/2014 |
|---|---|---|---|---|
| JP | 11257943 | A | * | 9/1999 |
| JP | 4138523 | B2 | * | 8/2008 |
| JP | 4485018 | B2 | * | 6/2010 |
| WO | WO-2019050448 | A1 | * | 3/2019 |

OTHER PUBLICATIONS

"LaRa-OHVD: An Innovative Over-Height Vehicle Detection System to Protect our Bridges to Prosperity." essay by A. Singhal, student essay submitted for ITS-NY 2015 Best Student Competition at 2015 Intelligent Transportation Society of New York 22nd Annual Meeting, Saratoga Springs, NY. (Year: 2015).*

LIDAR Speed-Measuring Device Performance Specifications, US Department of Transportation, National Highway Traffic Safety Administration. DOT HS 809 811 (Mar. 2013) (Year: 2013).*

"Warning Systems Evaluation for Overhead Clearance Detection" M.Maghiar et al., Georgia DOT Research Project, Feb. 2017 (Year: 2017).*

"Hampton Roads Traffic Surveillance and Control System", by J. Schesser et al. IEEE Transactions on Vehicular Technology, vol. VT-29, No. 2, May 1980. pp 137-149 (Year: 1980).*

"How to Detect Vehicle Presence or Movements with Magnometers, Part II", NXP blog, Oct. 14, 2016 (Year: 2016).*

"Sensor network data fault types". Ni et al., ACM Transactions on Sensor Networks, vol. 5, Issue 3, May 2009, pp. 1-29. (Year: 2009).*

"Traffic Measurement on Multiple Drive Lanes with Wireless Ultrasonic Sensors." S. Jeon et al. Sensors 2014, 14, 22891-22906 (Year: 2014).*

"Active-Infrared Overhead Vehicle Sensor" by R. Olson et al., IEEE Transactions on Vehicular Technology vol. 43, No. 1, Feb. 1994. (Year: 1994).*

* cited by examiner

FIG. 8

OVERHEIGHT VEHICLES IMPACT AVOIDANCE AND INCIDENT DETECTION SYSTEM

CROSS-REFERENCE TO RELATED APPLICATIONS

This U.S. nonprovisional application claims priority to, and the benefit of the filing date of, U.S. provisional application No. 62/861,026, filed on Jun. 13, 2019, entitled "OVERHEIGHT VEHICLES IMPACT AVOIDANCE AND INCIDENT DETECTION SYSTEM," which is incorporated by reference herein in its entirety.

TECHNICAL FIELD

The present disclosure is generally related to systems and methods for overheight vehicle impact avoidance and incident detection.

BACKGROUND

Collisions of overheight vehicles (which include semis, trucks, trailers and other cars as well as marine vehicles), with overhanging obstacles such as overpasses, bridges and tunnels, for example, cause fatalities, injuries to drivers and passengers, and damage to structure members or construction formwork on highways and even non-freeway truck routes. Overheight vehicles, i.e., vehicles that have been loaded incorrectly to an improper height, are not just hazardous to the vehicles themselves, but they primarily pose a threat to workers at a construction site and other drivers on the road when a collision occurs. Severe accidents occur when the overheight portion of a vehicle contacts a portion of the overpass, which are often the beams and/or girders of a superstructure.

Moreover, similar incidents can occur when a properly loaded vehicle comes into contact with an off-spec overhang (such as parking garages, low bridges in rural areas, etc.). The repair of the damaged portion of overpass/bridges/tunnels is a resource and time demanding process, which causes traffic halt and delays in most cases.

Many existing systems for overheight vehicle impact avoidance and incident detection have issues with false alarming. Some available systems run on a 120 volt (V) power supply and have been supplemented by advanced signing systems to warn truck drivers about the low vertical under-clearance bridge ahead. However, issues were reported during snow, rain, and exhaust from trucks, and bird activity that caused false sensor alarms. Such systems are often most needed when operating in these poor conditions as the driver/operator's vision may be impaired.

A need exists for a system and method for overheight vehicle impact avoidance and incident detection that are suitable for use in poor weather conditions to reduce or eliminate the occurrence of false alarms.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The drawings constitute a part of this specification and include exemplary embodiments of the Overheight Vehicles Impact Avoidance And Incident Detection System, which may be embodied in various forms. It is to be understood that in some instances, various aspects of the invention may be shown exaggerated or enlarged to facilitate an understanding of the invention.

FIG. 8 is a data representation in which date and time are shown, followed by two-lane data and by the index count, which is a troubleshooting data point used to match pictures of vehicles taken to the date and time of the incident; each lane has a vehicle present indicator (default at 14,000 where no car is present), followed by its corresponding average distance to sensor.

DETAILED DESCRIPTION

Figure 1:
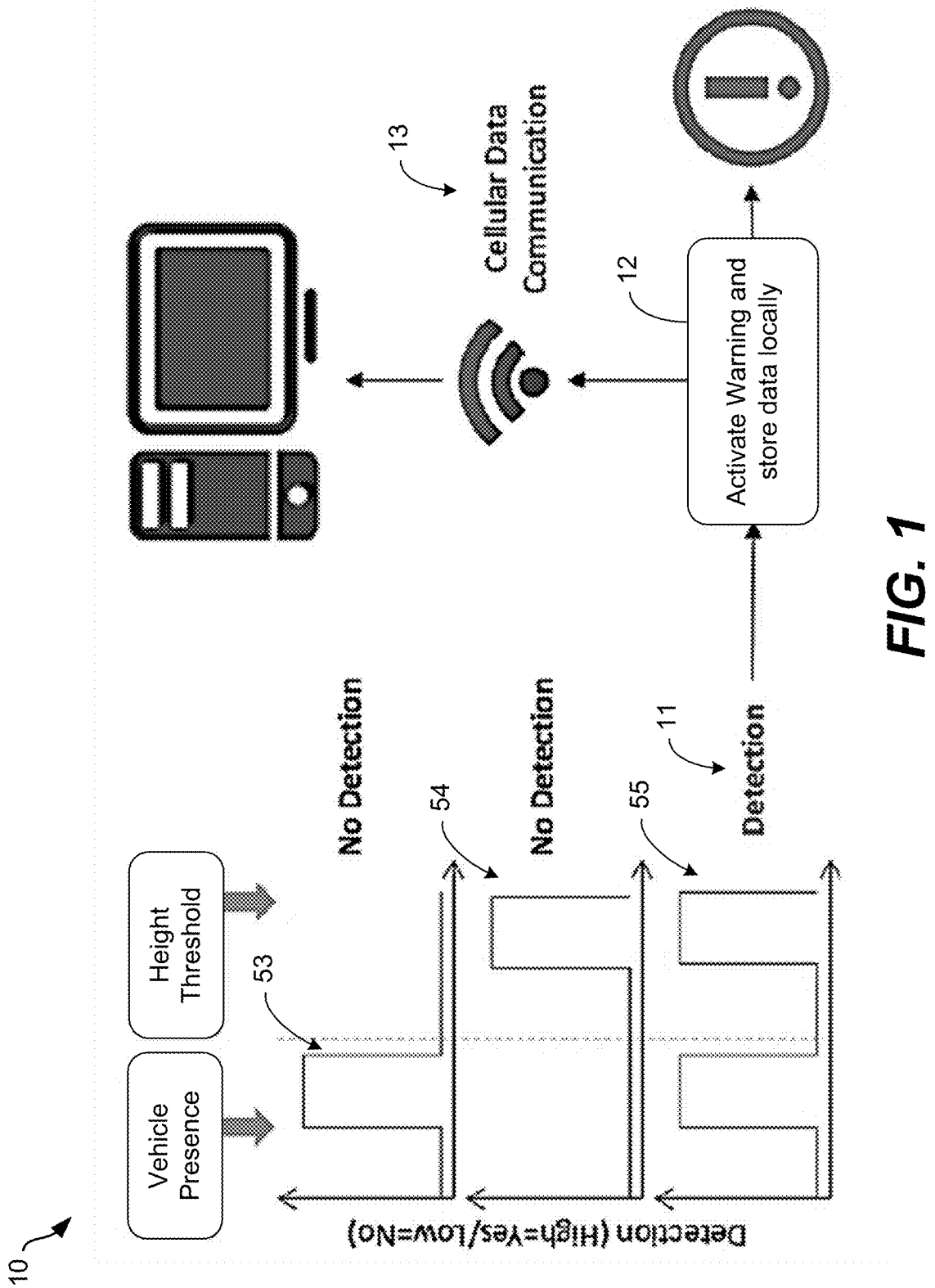
FIG. 1 is a schematic of the overall system overview, with a robust vertical/lateral triggering and warning system in accordance with a representative embodiment.

The present disclosure discloses representative, or exemplary, embodiments of a system and method for overheight vehicle impact avoidance and incident detection. In the following detailed description, for purposes of explanation and not limitation, exemplary, or representative, embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

The overall functionality of the system 10 is presented in FIG. 1 in accordance with a representative embodiment. The system can be divided into two subsystems: (1) detection subsystem and (2) a warning subsystem. The detection subsystem determines whether the incoming vehicle is clear to pass, depending at least on its height. In accordance with an embodiment, the detection subsystem relies on distance sensors placed directly above and/or on the sides of the freeway, such as, for example, under a crossing bridge, under a sign, mounted on an existing mast arm structure, mounted on a simple support structure, etc. This would allow the detection of the highest point of a vehicle and indicate whether it can pass.

The warning subsystem acts in reaction to a determination 11 about the vehicle generated by the detection subsystem. The warning subsystem comprises an indicator 12 that provides an indication to the driver about the vehicle's inability to pass upcoming structures. It may also direct the driver to take a bypass route to avoid the danger. The indicator may include any type of suitable indicator, such as, for example, one or more of an information board, a flashing light, and a speaker. Once a vehicle is determined to be outside the accepted height threshold, this warning subsystem preferably also logs and sends data about the event locally. Furthermore, the warning subsystem may use cellular data (via a SIM card or mobile hotspot) 13 to communicate with the central command and send the required information or may operate based on onboard memory of routes.

Sensors

To determine the height of an incoming vehicle, the detection subsystem can include one or more of various types of distance sensors that are suitable for this purpose. For example, a laser sensor exists that has an emitter that sends a pulse of laser light and measures the reflected pulse as it returns to a receiver of the sensor. The time difference between these two events is measured with high precision and converted to a distance measurement. These beams travel at the speed of light, yielding high rate of reading to detect fast moving objects. Laser sensors are usually more expensive and typically work for ranges up to 200 m (or 650 ft). State-of-the-art laser sensors can reach a signal obtaining rate of up to 1000 samples per second. Each laser-based sensor can consume up to 100 mA of current with a 5 V voltage supply, with operating temperatures of up to 85° C. (or 185° F.). A typical laser sensor would then consume around 500 mW per each sensor, on average.

In other embodiments, ultrasonic sensors, which work on similar principles, may be used. The difference is that high frequency sound waves are sent instead of light beams and the system calculates distance based on measurements of the sound reflections. These sensors have lower costs, but currently can reach distances up to 20 m (or 65 ft), on average. Sound waves, however, travel slower and are more prone to inaccurate measures due to additional noise and a lower intensity signal (light is easier to focus than sound). However, ultrasonic sensors can compensate possible errors of laser sensors during heavy rain or dense fog conditions. Ultrasonic sensors can reach a signal of up to 500 samples per second. Each ultrasonic-based sensor can consume up to 25 mA of current with a 3.3 V voltage supply, with operating temperatures of up to 65° C. (or 150° F.). A typical ultrasonic sensor consumes around 12.5 mW per sensor, on average. In alternate embodiments, the detection subsystem may comprise a combination of sound and light sensors or other sensors.

Other methods and devices may be used to measure distance, including time-of-flight sensors (typically used in drones). These are a viable option due to high read rate (around 1000 Hz) and acceptable power consumption of around 600 mW per sensor, on average. These sensors also utilize laser-based transmitters and can work at long ranges of up to 40 m (or 130 ft) with minimal crosstalk.

Other methods and devices that are suitable include radar, which is similar to the laser sensors except that radar uses electromagnetic waves in the radio or microwaves domain.

The system may further comprise a filtering device, circuit or algorithm configured to filter noisy data and to manage an overall average for a single vehicle to improve accuracy.

Figure 2A:
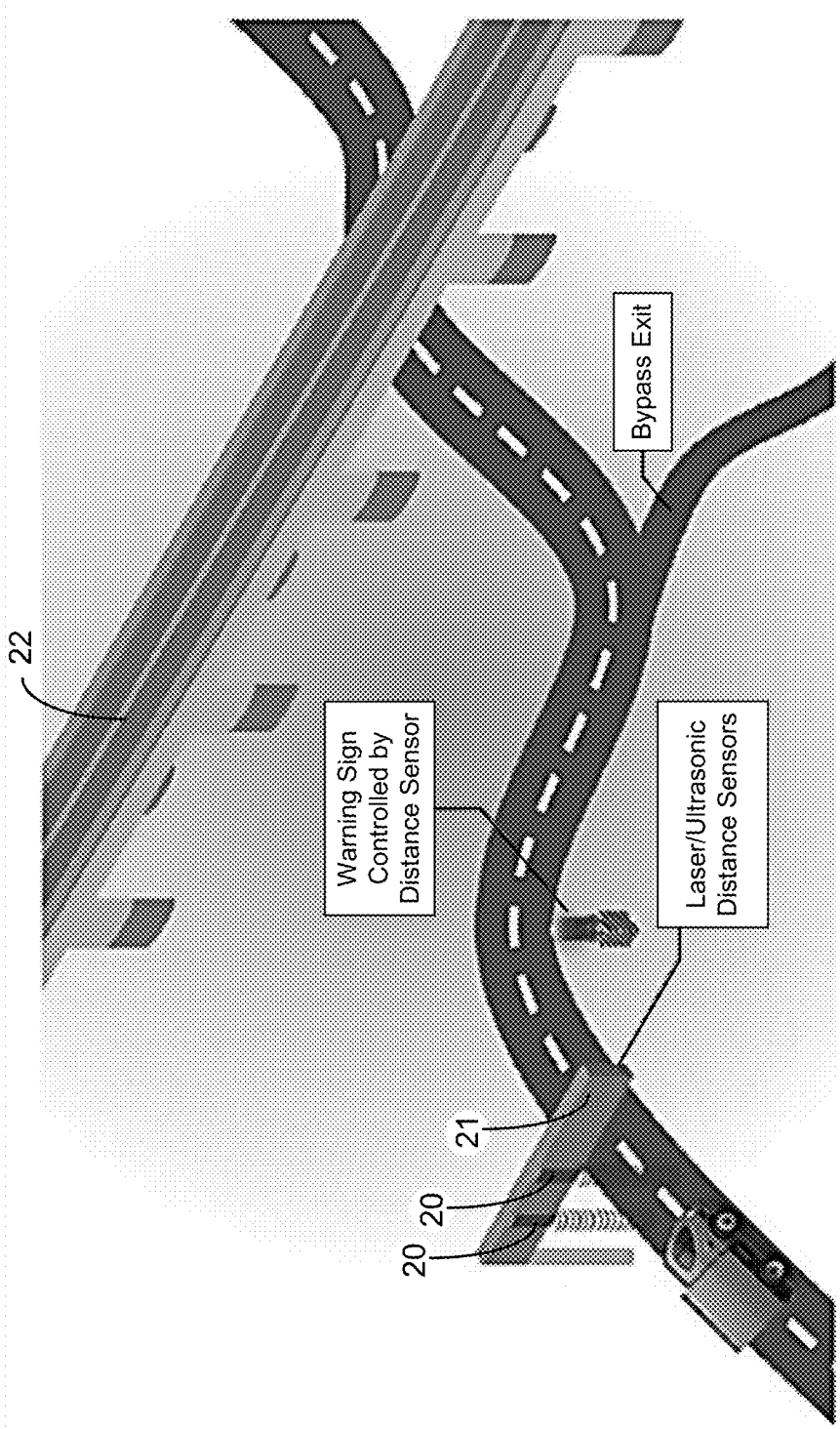
FIG. 2A is a schematic diagram of overhead placement of laser/ultrasonic sensors on a highway sign in accordance with a representative embodiment.
Figure 2B:
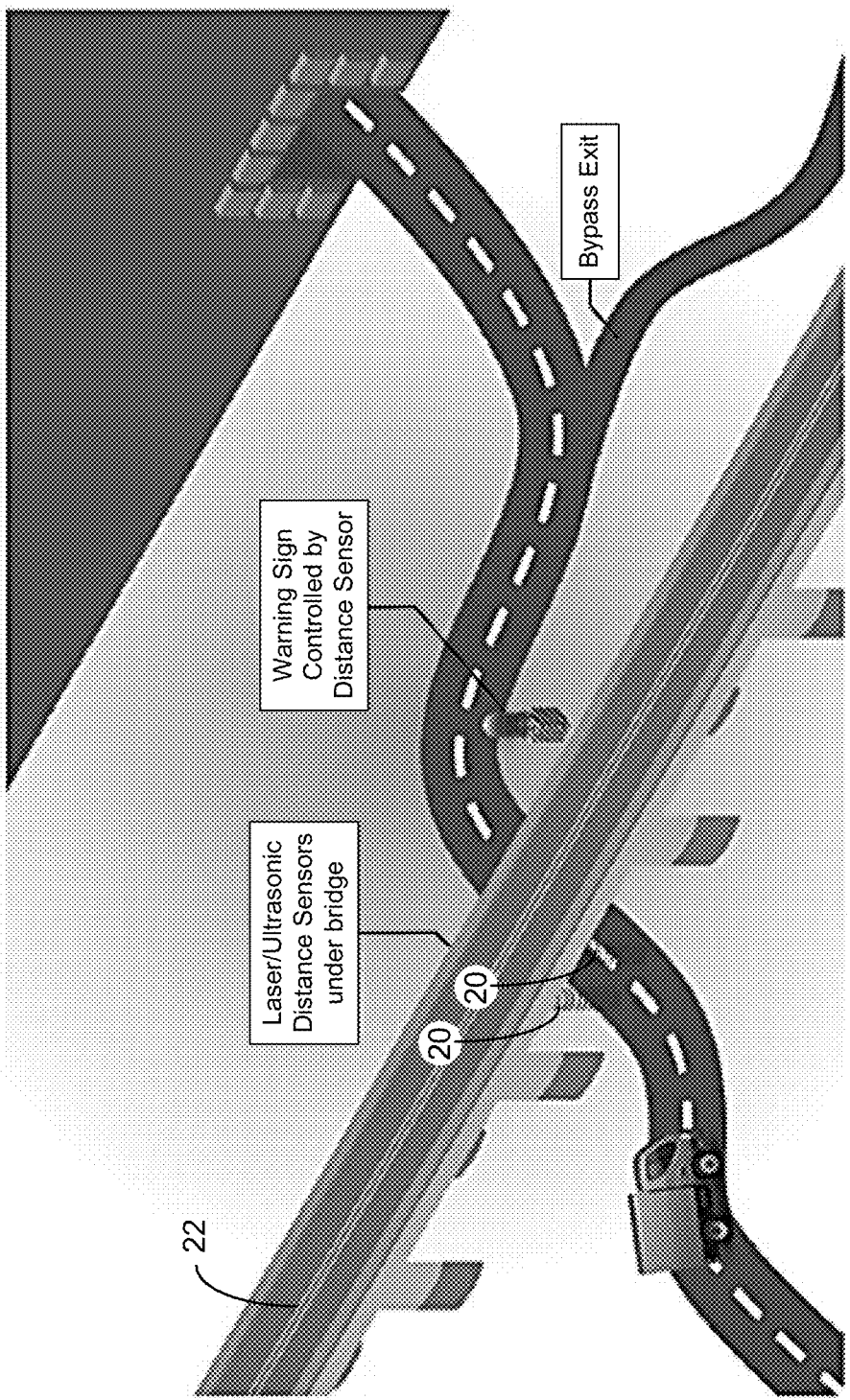
FIG. 2B is a schematic diagram of overhead placement of laser/ultrasonic sensors under an intersecting bridge.

Overhead Sensors
("Option 1"):

One embodiment of height detection performed by the detection subsystem utilizes overhead sensors to determine the height of a vehicle. FIGS. 2A and 2B show a schematic diagram of the overhead sensors 20 of the detection subsystem in accordance with an embodiment placed on a highway sign 21 and under an intersecting bridge 22, respectively. The overhead sensors 20 should be fast enough to detect every passing vehicle at high speeds. Thus, the overhead sensor 20 may be chosen for the particular area or application. For example, it is understood that a sensor used in a busy highway that allows high speed travel may need to provide additional readings as compared to a sensor employed in a slower speed, single lane, country road. For this purpose and estimating a large vehicle average speed on the highway, it has been determined that around 100 measurements per second will suffice to prevent missing any vehicle that passes. Even for a vehicle passing at 90 miles per hour, 100 measurements per second will provide height measurements at every 40 cm (or 15.7 in) along the vehicle, which is sufficient.

Infrared lasers and ultrasonic sensors 20 can both detect measurements under the required conditions. They can take fast, reliable measurements and send them to a processor or controller of the warning subsystem to activate the warning signal(s). The accuracy in these sensors reaches less than 10 cm (or 4 in) error at up to 40 m (or 130 ft) measuring distance. The resulting measured value can be interpreted by a processor or controller of the detection subsystem to indicate a true positive (or a reliable value, i.e., an incident or, specifically, an overheight vehicle). In some examples, each individual sensor can consume around 50 mA, on average, and require 5 V. These power consumption values are well within the range of solar panels and batteries. Possible drawbacks of this option may be the high temperatures at which they are required to operate. Most ultrasonic sensors operate at around 50° C. (or 122° F.) maximum, so a properly ventilated casing and mount should be used. Low reflective surfaces and soft surfaces can also yield noise in the readings of laser sensors and ultrasonic sensors, respectively. Due to the need for accurate distance measurements, these sensors might be slower than other alternatives. To increase the robustness of this option, an array of sensors could be placed horizontally to work simultaneously.

In one or more embodiments, an array of sensors 20 is placed for each traffic lane. For robustness, around three to four sensors 20 can be placed for each lane for constant monitoring of traffic height. Assuming two lanes for one direction, this would result in a total of six to eight sensors 20 working together to evaluate traffic on a wide highway. Total power consumption of eight sensors for laser, ultrasonic, and time of flight sensors can be up to 4 W, 100 mW, and 5 W, respectively. It should be noted, however, that the inventive principles and concepts are not limited with respect to the power consumption requirements of the sensors.

Figure 3:
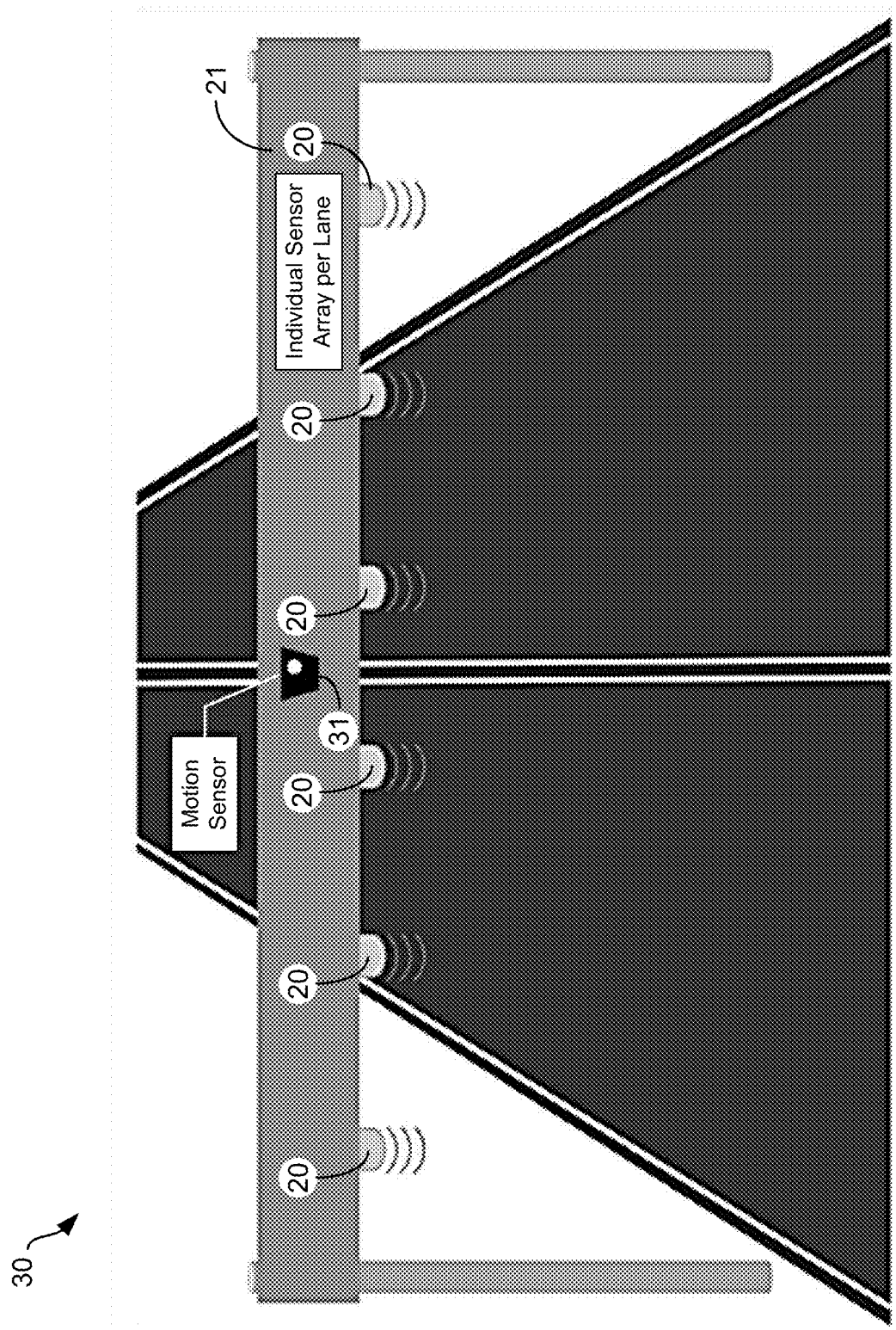
FIG. 3 is a schematic diagram of an overhead sensor cross-sectional layout in accordance with a representative embodiment.

FIG. 3 is a schematic diagram of an overhead sensor cross-sectional layout 30 of Option 1 in accordance with a representative embodiment. To conserve power, a simple motion sensor 31 can be included to detect whether a vehicle is approaching to avoid having to activate the sensors 20 of the distance sensor array unless a vehicle is approaching. If the distance sensor array detects an overheight vehicle, while the motion sensor 31 detected the presence of a vehicle, the warning will be triggered.

Several error correction functionalities can be included in the system 10 under Option 1. First, the duration of the positive signal (positive means that an overheight vehicle passes) can be monitored. A false signal could be generated by insects or other obstacles, in which long signals that cannot possibly represent a vehicle can be eliminated from the decision-making process. This issue can be made even more uncommon by adding several sensors per lane; redundancy will increase overall functionality, as shown in FIG. 3. Since the distance between the sensors 20 and the pavement is always constant, this value can be used to calibrate the sensors 20 periodically to keep them at full functionality and accuracy. Periodic and automatic calibration can be made and reports about all sensors 20 can be transmitted to the central command to determine if maintenance is necessary.

Figure 4:
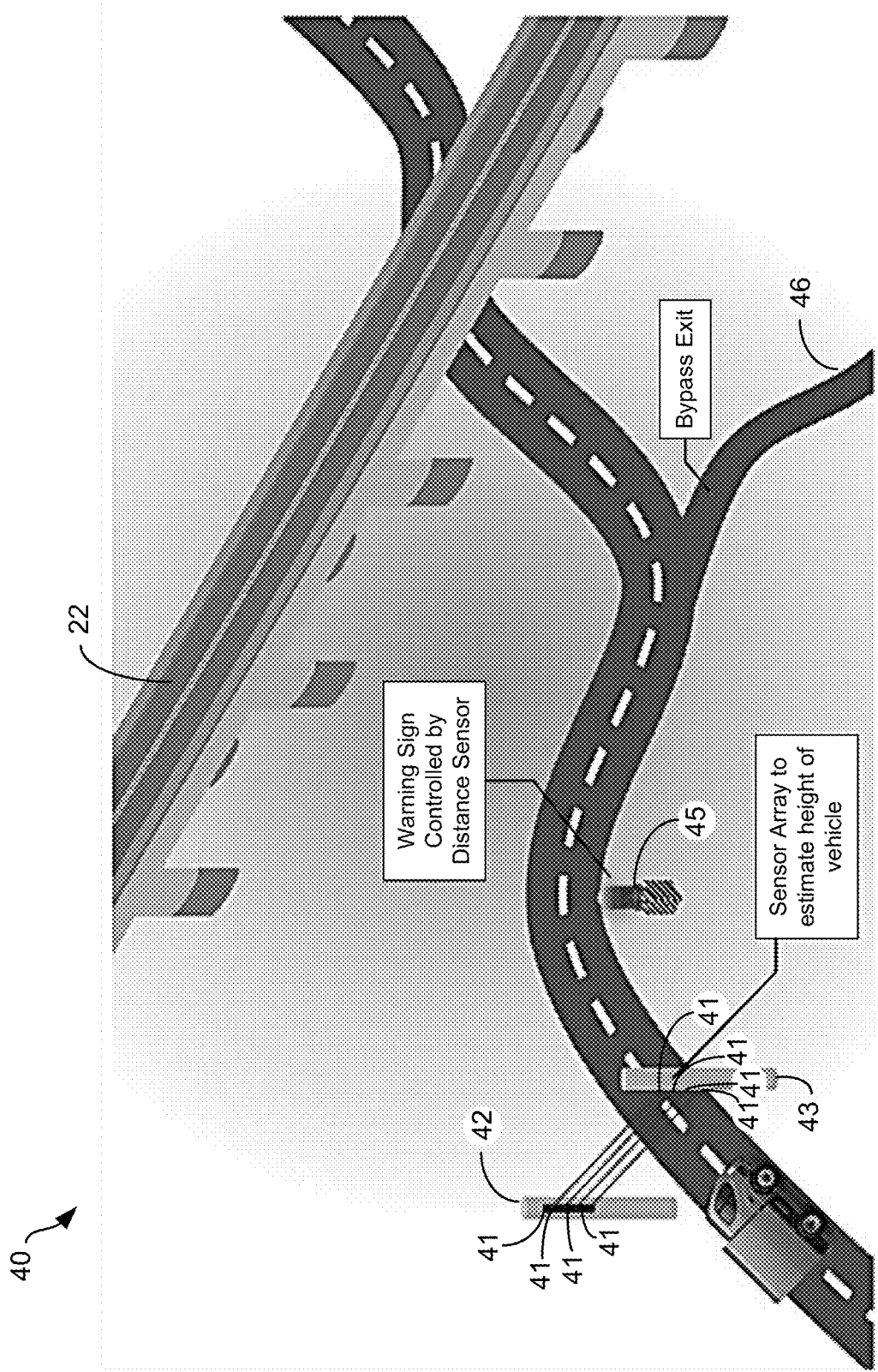
FIG. 4 is a schematic of a lateral sensor cross-sectional layout in accordance with a representative embodiment.

Lateral Sensors
("Option 2"):

FIG. 4 is a schematic diagram of a lateral sensor cross-sectional layout 40 in accordance with a representative embodiment. In accordance with this embodiment, one or more laser sensors 41 can be placed on both sides of the road, as seen in FIG. 4. These sensors 41, although they may be laser-based, do not measure the distance from emitter to the vehicle. Instead, the laser beams of the sensors 41 will be emitted from the sensors on one pole 42 and received by receivers of the sensors 41 on the other pole 43, constantly or periodically, and if a vehicle intercepts the laser beams, the receivers of the sensors 41 on the receiving pole 43 will not receive the laser beams. Placing these pairs of emitters and receivers at specific heights will allow the subsystem to estimate the overall height of the vehicle, since the number of intercepted pairs from the bottom to the top will give a step measurement of the overall height.

It should be noted that each of the sensors 41 does not have to both a laser beam emitter and a laser beam receiver. For example, the sensors 41 on pole 42 can have only laser beam emitters and the sensors 41 on pole 43 can have only laser beam receivers, or vice versa. One of the emitter/receiver pairs can work as a threshold sensor; meaning that if a vehicle intercepts that laser beam, the warning sign 45 will be triggered, indicating to the driver of the vehicle to take the next bypass exit 46. All of the information about the vehicles crossing this height threshold can be logged and sent by the controller or processor of the warning subsystem to a data storage device for analysis purposes.

This method of Option 2 can be considerably faster than the method of Option 1 because no accurate height measurements are needed with Option 2. The laser beams travel at light velocity, so every intersection can be accounted for. A drawback of Option 2 is that noise can affect some of the readings. For example, a bird flying through the sensors 41 can potentially activate a false positive. Furthermore, strong winds might move the poles 42 and 43 and sensors 41, yielding additional noise to the measurement. Various signal processing algorithms can be performed by a controller or processor of the detection subsystem to remove noise and reduce false positives.

Figure 5:
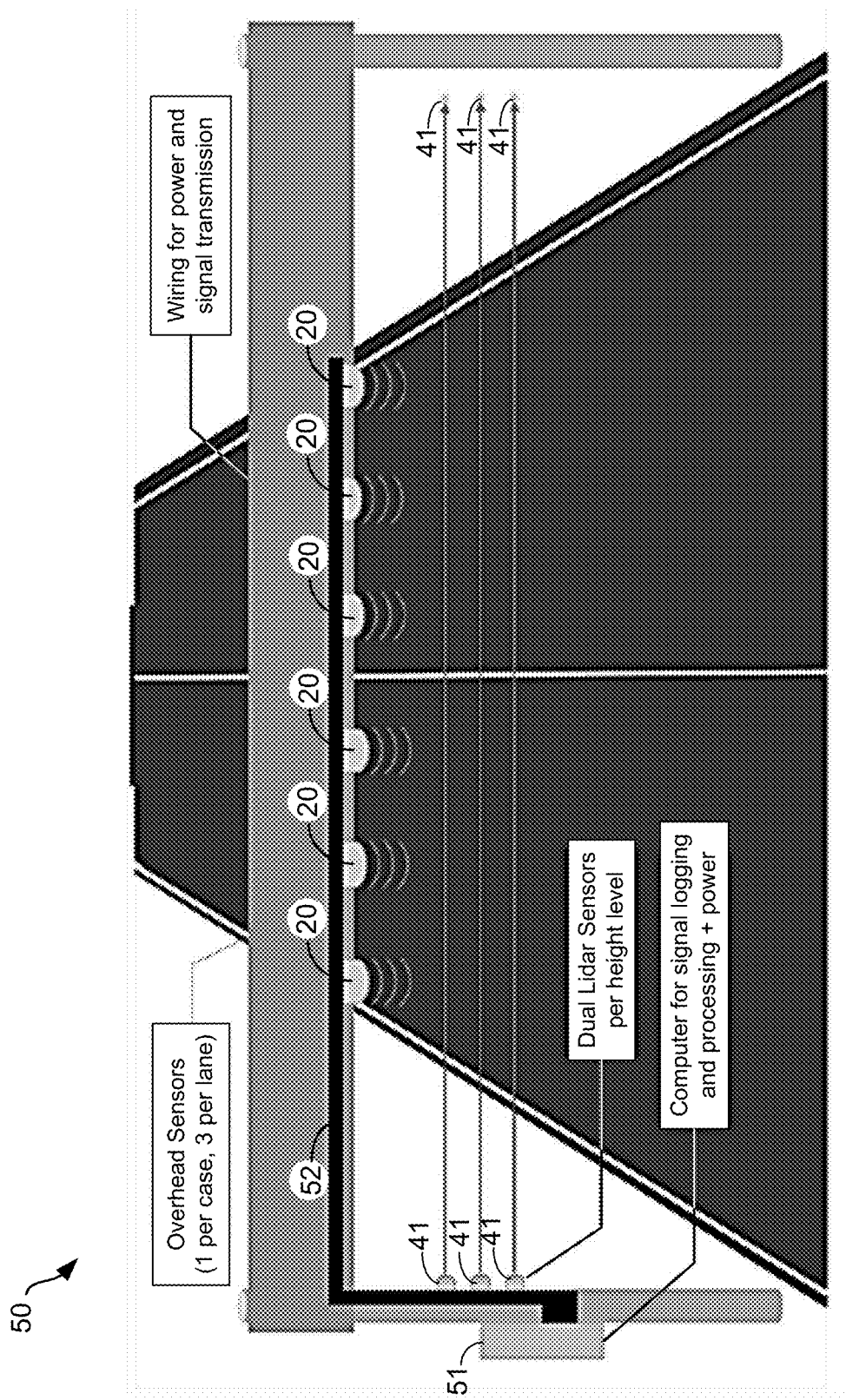
FIG. 5 is a schematic diagram of combination lateral and overhead sensor cross-sectional layout in accordance with a representative embodiment in which overhead sensors and lateral sensors work together to determine if the vehicle is present and if it is overheight.

FIG. 5 is a schematic diagram of combination lateral and overhead sensor cross-sectional layout 50 in accordance with a representative embodiment in which overhead sensors 20 and lateral sensors 41 work together to determine if a vehicle is present and if it is overheight. This embodiment provides a technique for solving the issue of false positives.

As seen in FIG. 5, a small array of sensors 41 can be placed at a low height that will certainly be intersected by any vehicle. The sensors 41 will not only determine the presence of any vehicle, but will also help make the decision of whether a false positive is occurring. The overhead sensors 20 will measure the height of the vehicle in the manner described above. A box 51 can contain the processor(s) or controller(s) of the detection and warning subsystems and can also include a power source for providing power via electrical wiring 52 to the sensors 41 and 20.

The warning signal will only be triggered if both the overhead sensors 20 detected a high vehicle and the lateral sensors 41 detected the presence of a vehicle. The general working principle of this technique is described above with reference to FIG. 1. With reference again to FIG. 1, three different cases are shown using both groups of sensors 20 and 41, but only one case will trigger the warning signal. In the first case 53, the lateral sensors 41 have detected the presence of a vehicle, but the overhead sensors 20 have not detected an overheight vehicle. In the second case 54, the lateral sensors 41 have not detected the presence of a vehicle, but the overhead sensors 20 have detected an overheight vehicle. For example, if a bird flies through an overhead sensor 20, it can trigger the height threshold, but the system will not recognize it because the lateral sensors 41 did not detect the presence of a vehicle. In the third case 55, the lateral sensors 41 have detected the presence of a vehicle and the overhead sensors 20 have detected an overheight vehicle, and therefore the warning signal is triggered by a positive signal 11 being sent by the detection subsystem to the warning subsystem.

As with Option 1, the duration of the positive signal 11 can also be considered when making decisions on whether the warning signal should be activated. For example, if the lateral sensors 41 detect the presence of a vehicle for more than a few seconds, it can be concluded that there is an issue with one or more of the sensors 41 and that maintenance is in order. A threshold signal duration can be added for the overhead sensors 20 as well. This will further prevent false positives and improve the overall functionality of the system 10.

Figure 6:
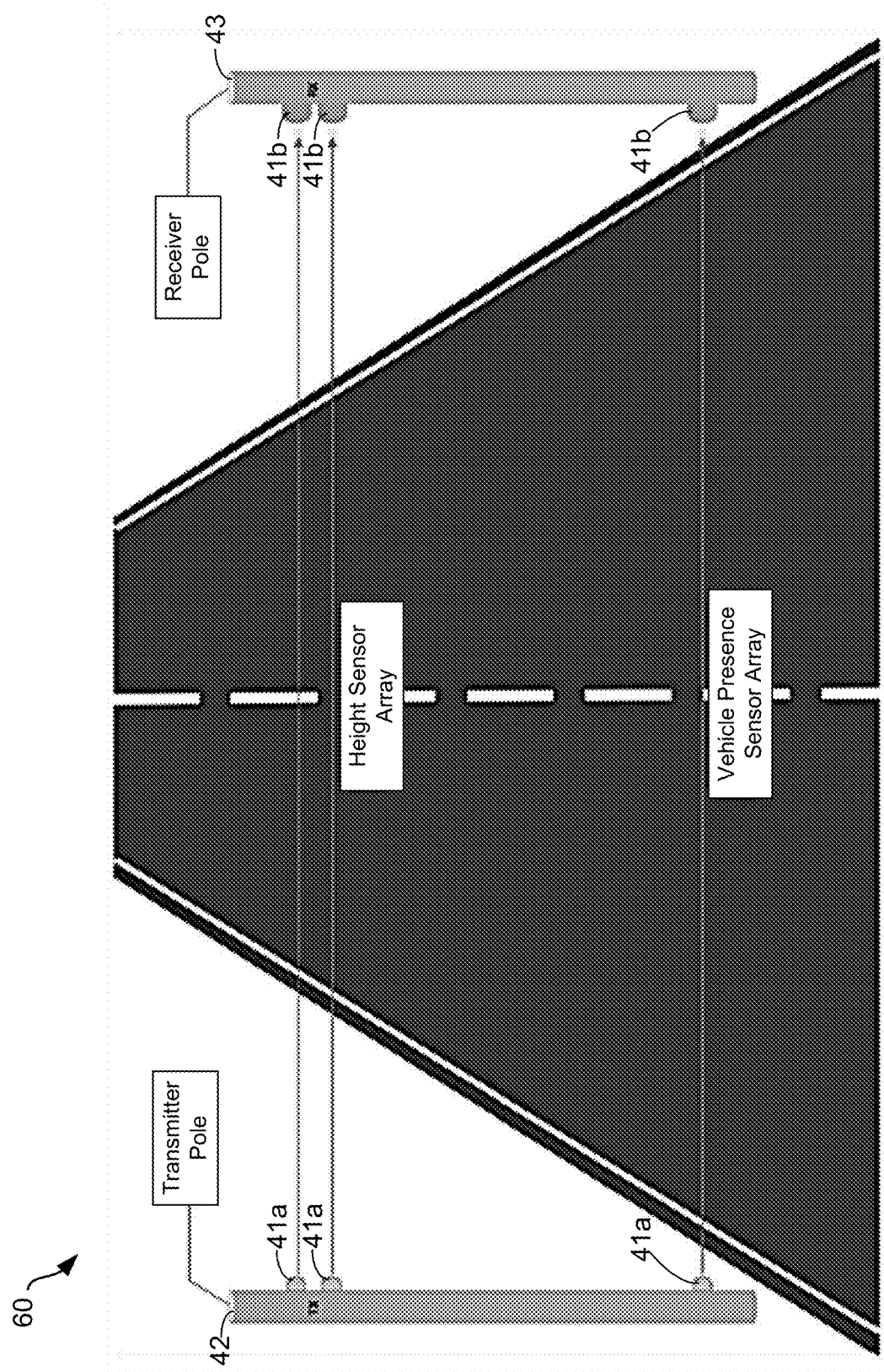
FIG. 6 is a schematic diagram of a hybrid sensor cross-sectional layout in accordance with a representative embodiment in which lateral sensors are used for detecting vehicle presence and overheight.

Overall System, Hybrid Lateral/Vertical Sensors ("Option 3"):

FIG. 6 is a schematic diagram of a hybrid sensor cross-sectional layout 60 in accordance with a representative embodiment in which lateral sensors 41 are used for detecting vehicle presence and overheight. This third option involves placing lateral laser sensors 41 on poles 42 and 43 on opposite sides of the road and on top of the lanes, as shown in FIG. 6. This hybrid lateral/vertical arrangement of sensors 41 has the advantages of Option 1 and Option 2, in one system. Similar to Option 1, this system utilizes sensor 41 mounted higher to determine the height of a vehicle. These sensors 41 can be placed either under an intersecting bridge or already existing truss structure, or on a specifically built structure (truss or monotube structure). The sensors 41 placed should be fast enough to detect every passing vehicle at high speeds. Infrared lasers and ultrasonic sensors can both make the measurements under these conditions. Also, like Option 2, the lateral sensors 41, although also laser-based, do not measure the distance from emitter to the vehicle. Instead, the emitters 41*a* of the laser sensors 41 emit laser beams from one pole 42 to the receivers 41*b* on the other pole 43 constantly or periodically. If a vehicle intercepts the laser beams, the receivers 41*b* on receiving pole 43 will not receive them.

Placing these pairs of emitters 41*a* and receivers 41*b* at specific heights allows the detection subsystem to estimate the overall height of the vehicle, since the number of intercepted pairs from the bottom to the top will give a step measurement of the overall height. The emitter/receiver pairs 41*a*/41*b* mounted just above the surface of the highway are used to detect the presence of a vehicle. Therefore, this embodiment can operate in the manner described above such that only third case 55 (FIG. 1) results in a warning signal.

The hybrid lateral/vertical sensor arrangement shown in FIG. 6 provides better coverage over multiple lanes. Moreover, crosstalk is inevitable in some conditions, where vehicles are not driving in their respective lanes. Thus, an anti-crosstalk code for improving cases in which a car is on the next lane may be used.

Example 1

Figure 7:
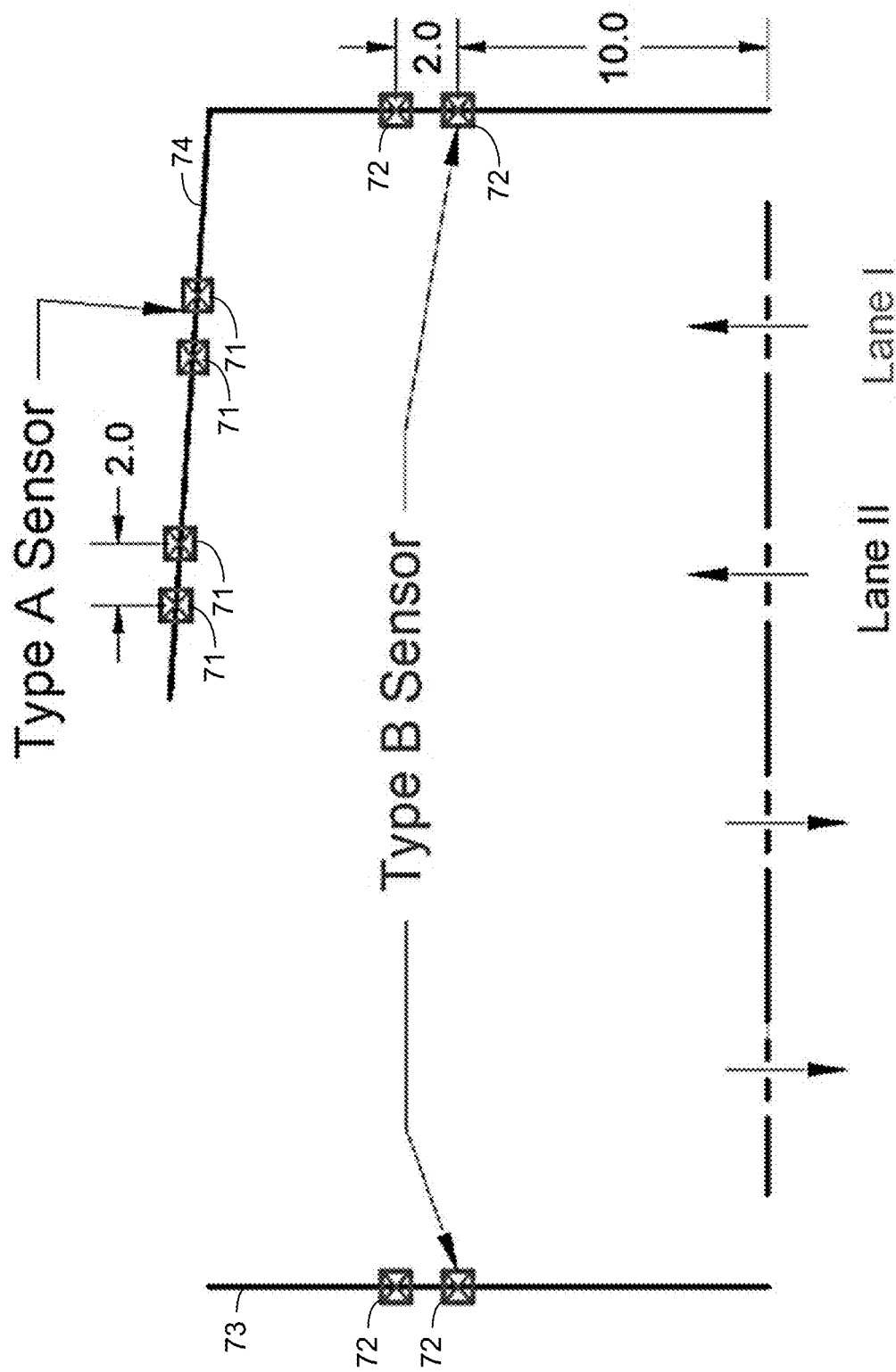
FIG. 7 is a schematic diagram that depicts the location of sensors on two mast arm support structures that host the detection subsystem in accordance with a representative embodiment.

FIG. 7 is a schematic diagram that depicts the location of sensors 71 and 72 on two mast arm support structures 73 and 74, respectively, that host the detection subsystem in accordance with a representative embodiment that was used in an experimental setup. For the experimental setup, sensors 71 and 72 are Type A and Type B sensors, respectively. First and second pairs of sensors 71 were disposed above first and second lanes, Lane I and Lane II, respectively. First and second pairs of sensors 72 were disposed on the first and second support structures 73 and 74, respectively. The sensors 71 and 72 can have the following characteristics:

Type A Sensor
Vertical sensor
Principle: Infrared time-of-flight
Supply voltage and current: 12 V, 50 mA average
Connector: 15-pin DF13
Dimension: 35 mm×29 mm×18 mm (1.378×1.142×0.709 in3)

Type B Sensor
Horizontal (or lateral) sensor
Principle: Infrared time-of-flight
Supply voltage and current: 5 V, 135 mA
Connector: 8-pin connector
Dimension: 20 mm×48 mm×40 mm (0.787×1.890×1.575 in3)

Preliminary functionality of vertical sensors 71 was achieved. Data was collected by averaging the two pairs of sensors for each lane and comparing the current value being read with the previous value. This allows for the detection of sudden changes in distance, which confirms the presence of passing vehicles and triggers a vehicle counter.

Collection of data was based on distance to sensor thresholds, upon which an algorithm logs the time and date of the data point and stores its corresponding photograph. In order to save space, an ongoing test is arranged only to take a single photo (or only a few) of each incident in which a vehicle is crossing the sensor threshold. A small counter may be used to skip some frames once a vehicle is detected, thereby reducing the space taken by photos by around 50%.

The system is using a rising edge detection algorithm to verify that a vehicle is passing, after which it adds a small delay such that the same vehicle does not trigger the counter more than once. Accurate height measurements were taken in only one lane at a time during the preliminary test and calibration phase, but both lanes have vehicle presence detection, which triggers the vehicle count to be reported and the photos to be taken and stored. The data was collected and analyzed for two-lane measurements once the preliminary test was completed.

Figure 8:
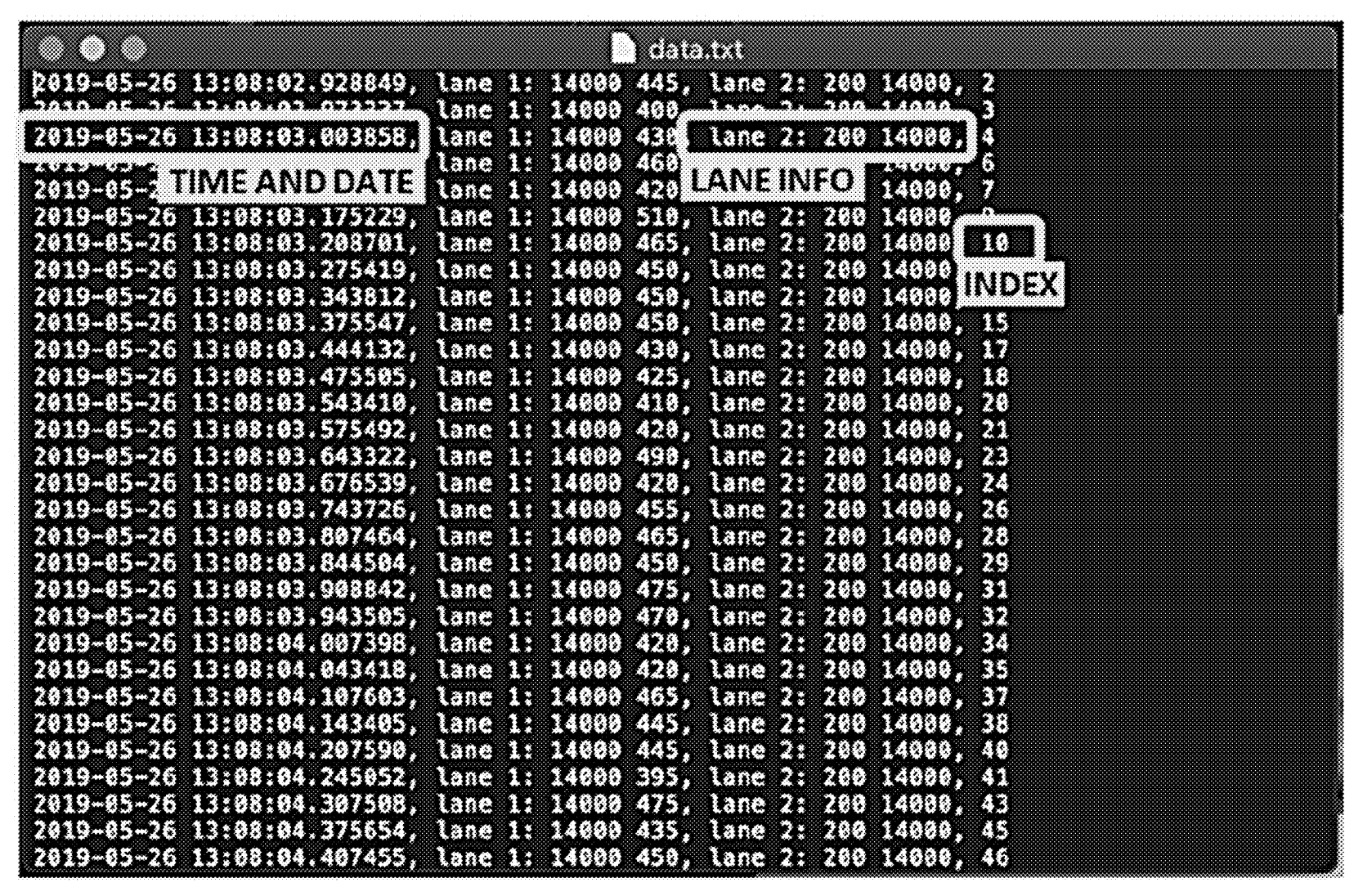

FIG. 8 shows the raw data reporting the sensor reading at a specific time and date. For each second, the system takes around 100 samples of height data, but 20 are reported in order to save storage space on data collection. This makes the system fully responsive to any reasonable vehicle speed, allowing the reduction of any missed vehicles being detected due to fast velocity.

For each incident, height is calculated based on the average distance from the vehicle to the sensor 71, when compared to the distance between the sensor 71 and the pavement. This value is further used to categorize each vehicle based on its class. Table 1 below shows the classes used in this example. With additional calibration and noise reduction, the system will be able to accurately show height of each vehicle as it passes its threshold.

TABLE 1

| Category | Description |
|---|---|
| 1 | Compact-Sedan |
| 2 | Mini SUV-SUV-Small Pickup |
| 3 | Large SUV - Regular Pickup |
| 4 | Large Truck |

Figure 9:
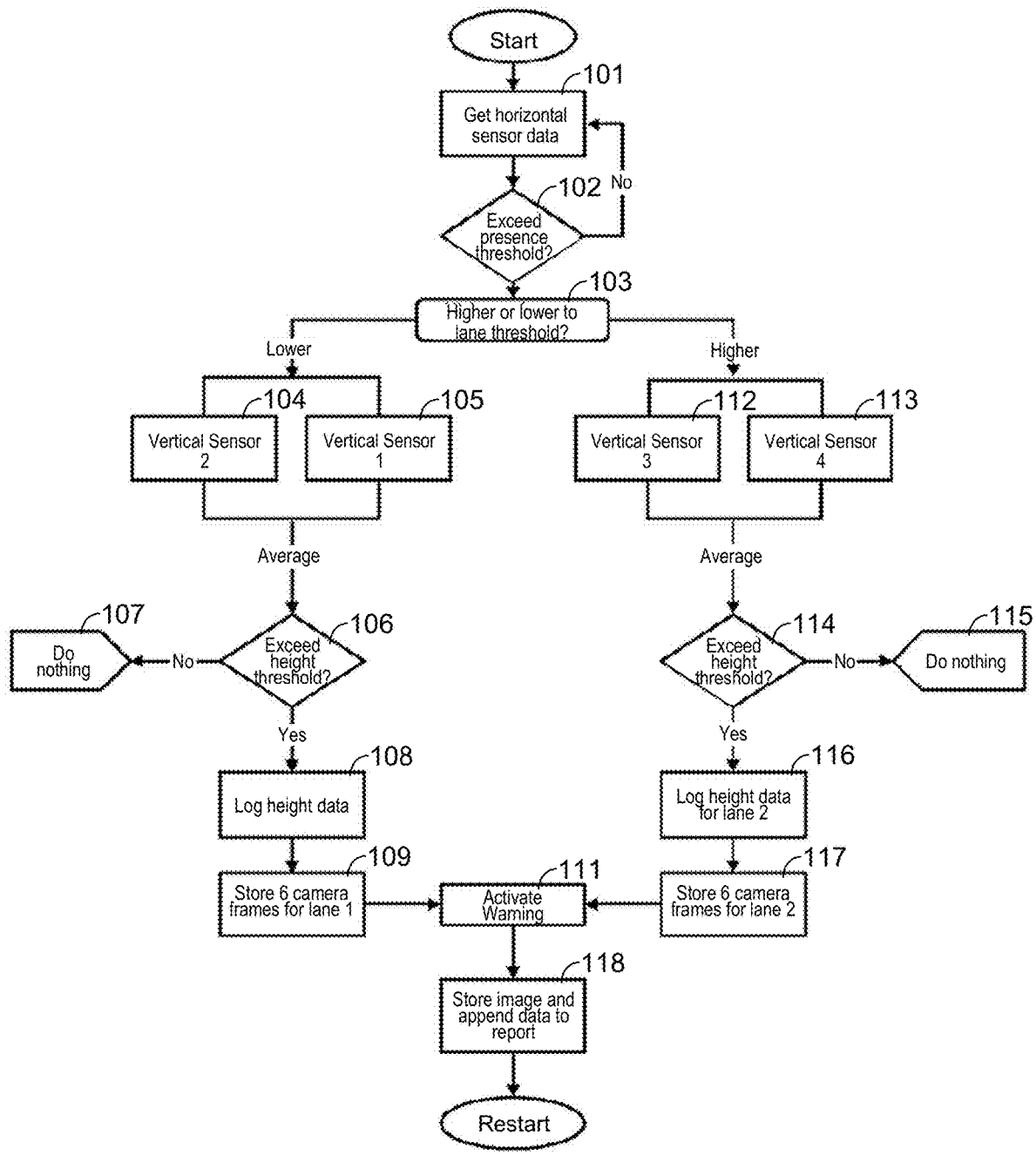
FIG. 9 is a flow diagram of the detection and warning subsystem algorithm for two lanes, in a continuous loop, in accordance with a representative embodiment.

FIG. 9 is a flowchart illustrating an algorithm performed by the detection and warning subsystems in accordance with a representative embodiment using the experimental setup described above with reference to FIGS. 7 and 8. According to this example, all sensors 71 and 72 are active at all times, including a camera (not shown) for real-time monitoring. At block 101, the values obtained by the lateral sensors 72 are collected and averaged to determine what is considered a "lane." This includes filtering and averaging to avoid noise. At block 102, this value is compared to a "presence threshold," which indicates if there is a vehicle present in either of the two lanes being observed. If presence of a vehicle is detected at block 102, then the process proceeds to blocks 104 and 105 to determine whether the presence corresponds to a vehicle in lane I or Lane II.

At block 103, the averaged value is compared to a value corresponding to a lane threshold value, which is a value corresponding to a midpoint between the lanes. If the averaged value is lower than the lane threshold value, then the vehicle is in Lane I and the process proceeds to blocks 104 and 105. If the averaged value is higher than the lane threshold value, then the vehicle is in Lane II and the process proceeds to blocks 112 and 113. At blocks 104 and 105, the values output from the Lane I sensors 71 are obtained and averaged. The averaged value is compared to a height threshold at block 106 to determine whether the vehicle is overheight. If not, the process proceeds to block 107, or returns to block 101 and restarts the process. If so, the warning is activated at block 111. Block 108 represents an optional step of logging the height date and block 109 represents the option step of storing image frames captured by a camera of the overheight vehicle. Block 118 represents the optional step of storing the image data and appending the data to a report.

If a determination is made at block 103 that the averaged value is higher than the lane threshold value, then the vehicle is in Lane II and the process proceeds to blocks 112 and 113. At blocks 112 and 113, the values output from the Lane II sensors 71 are obtained and averaged. The averaged value is compared to the height threshold at block 114 to determine whether the vehicle is overheight. If not, the process proceeds to block 115, or returns to block 101 and restarts the process. If so, the warning is activated at block 111. Block 116 represents an optional step of logging the height date and block 117 represents the option step of storing image frames of the overheight vehicle captured by a camera.

At blocks 104, 105, 112 and 113, the vertical sensor data is used to calculate an average sensor-to-vehicle distance. This can then be subtracted the calibration measurement (which is the sensor-to-ground distance) to calculate the average vehicle height.

If the vehicle is determined to be overheight, the height data, along with vertical data and date/time can be logged at blocks 108 and 116. When the warning signal is activated at block 111, this can trigger the capture of the image frames at blocks 109 and 117 and stored at block 118 to record an image of the vehicle being profiled. All sensor data for vehicles exceeding the threshold, along with time-stamped images, can be appended to a report that can be sent periodically to, or obtained on-demand by, central command.

In one or more embodiments, the algorithm is configured to differentiate cars passing at the same time. In these embodiment, additional lateral sensors can be used. For example, additional sensors placed at multiple height levels are used. Wind may also disorient the poles, resulting in misalignment between the transmitter and receiver. This problem can be overcome by providing the receivers with a greater angle of view.

Figure 10:
FIG. 10 depicts various examples that indicate the index, used to determine the time and date, the height of the vehicle, and its corresponding category.

Some example incidents are shown in FIG. 10 that indicate the index used to determine the time and date, the height of the vehicle, and its corresponding category. The system has also taken and stored photos automatically once it detected and categorized a vehicle. The system saves the picture only if a vehicle has been detected after error correction and false positive removal, in order to save space and to report in a concise and accurate manner.

Figure 11:
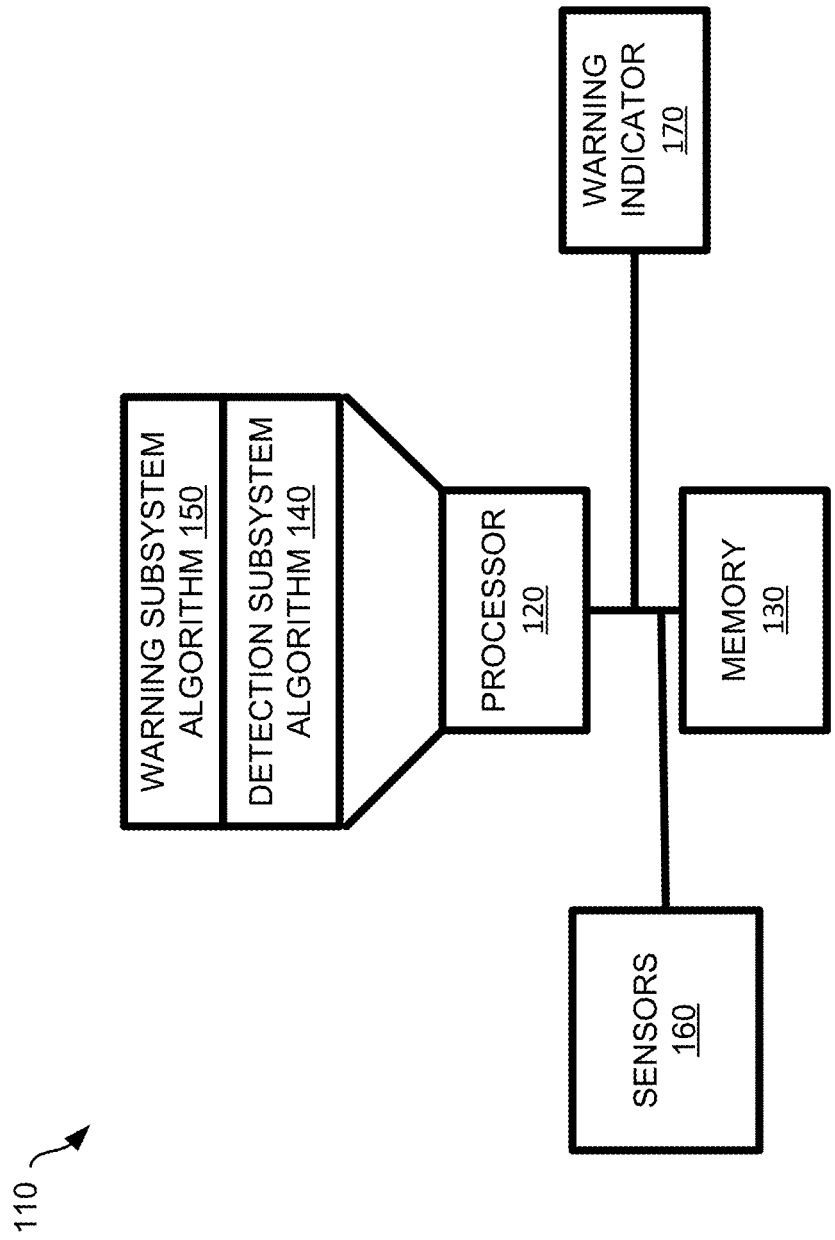
FIG. 11 is a block diagram of the system in accordance with a representative embodiment comprising a processor that performs a detection subsystem algorithm and the warning subsystem algorithm.

FIG. 11 is a block diagram of the system 110 in accordance with a representative embodiment. The system 110 comprises a processor 120, which performs the algorithms discussed above, a memory device 130, sensors 160 and one or more warning indicators 170. The sensors 160 may be any of the sensor configurations described above with reference to FIGS. 1-9. The memory device 130 stores the computer instructions corresponding to algorithms that are performed by the processor 120 and data, which are represented in FIG. 1 as detection subsystem algorithm 140 and the warning subsystem algorithm 150. The system 110 may optionally include other devices, such as input and/or output devices (e.g., keyboard, keypad, a printer, a display device, etc.).

The flowchart of FIG. 9 shows the functionality and operation of an exemplary implementation of algorithms performed by the processor 120. Many variations may be made to the method represented by the flowchart while still achieving the goals described herein. Also, while particular algorithms have been described herein for carrying out specific tasks, other algorithms not specifically mentioned herein may be used to accomplish the same task.

It should be noted that any or all portions of algorithms described above that are implemented in software and/or firmware being executed by a processor (e.g., processor 120) can be stored in a non-transitory memory device, such as the memory device 130. For any component discussed herein that is implemented in the form of software or firmware, any one of a number of programming languages may be employed such as, for example, C, C++, C#, Objective C, Java®, JavaScript®, Perl, PHP, Visual Basic®, Python®, Ruby, Flash®, or other programming languages. The term "executable" means a program file that is in a form that can ultimately be run by the processor 120. Examples of executable programs may be, for example, a compiled program that can be translated into machine code in a format that can be loaded into a random access portion of the memory device 130 and run by the processor 120, source code that may be expressed in proper format such as object code that is capable of being loaded into a random access portion of the memory device 130 and executed by the processor 120, or source code that may be interpreted by another executable program to generate instructions in a random access portion of the memory device 130 to be executed by the processor 120, etc. An executable program may be stored in any portion or component of the memory device 130 including, for example, random access memory (RAM), read-only memory (ROM), hard drive, solid-state drive, USB flash drive, memory card, optical disc such as compact disc (CD) or digital versatile disc (DVD), floppy disk, magnetic tape, static random access memory (SRAM), dynamic random access memory (DRAM), magnetic random access memory (MRAM), a programmable read-only memory (PROM), an erasable programmable read-only memory (EPROM), an electrically erasable programmable read-only memory (EEPROM), or other like memory device.

It should be emphasized that the above-described embodiments of the present invention are merely possible examples of implementations, merely set forth for a clear understanding of the inventive principles and concepts. Many variations and modifications may be made to the above-described embodiments without departing from the scope of the present disclosure. All such modifications and variations are intended to be included herein within the scope of this disclosure and protected by the following claims.

What is claimed is:

1. A vehicle detection system comprising:
   at least one motion sensor;
   a plurality of sensors, said plurality of sensors each being either a vertical sensor or a lateral sensor, and wherein at least one of said plurality of sensors is the vertical sensor and wherein at least two of said plurality of sensors are coupled, wherein a pair of said lateral sensors are coupled, said pair of lateral sensors are positioned to detect a presence of a vehicle on a roadway, wherein the plurality of sensors are activated based upon a detected approach of the vehicle by the at least one motion sensor; and
   at least one processor electrically coupled to said plurality of sensors and the at least one motion sensor, said at least one processor being configured to perform:
      a vehicle presence algorithm that detects the approach of the vehicle based on an output of said at least one motion sensor;
      a detection subsystem algorithm that identifies a lane of the roadway in which said vehicle is present based upon outputs provided by at least said pair of lateral sensors and detects a vehicle height of said vehicle in said lane based at least in part on outputs of one or more vertical sensor of said plurality of sensors, the vehicle height compared to a height threshold; and
      a warning subsystem algorithm that receives an indication from the detection subsystem algorithm that an overheight condition has been detected based upon said comparison and provides a warning indication to a driver of the vehicle.

2. The system of claim 1, wherein said plurality of sensors is selected from the group consisting of laser sensors, ultrasonic sensors, and time-of-flight sensors.

3. The system of claim 1 wherein said plurality of sensors is capable of taking at least one measurement on the vehicle with a speed up to 100 miles per hour.

4. An overheight road vehicle detection system comprising:
   a detection subsystem configured to determine a height of a vehicle and to compare said height to a set height value, said detection subsystem comprising a plurality of sensors placed in preselected locations to detect a passing vehicle and to output detection signals, the detection subsystem determining said height based at least in part on the detection signals output by at least one of said plurality of sensors, and if said detection subsystem determines that said height is above said set height value then a duration of said detection signals is monitored; and
   a warning subsystem coupled to said detection subsystem, such that when said detection subsystem determines that said height is above said set height value and said monitored duration is less than a defined threshold, said warning subsystem triggers a warning indicator, and wherein the warning subsystem stores information relating to the determination of height and the comparison of said height to said set height value by said detection subsystem.

5. The system of claim 4, wherein said warning subsystem further comprises a transmitter, said transmitter capable of transmitting said stored information to a receiver.

6. The system of claim 5, wherein said transmitter comprises a cellular data transmitter, a WiFi transmitter, or a Bluetooth transmitter.

7. The system of claim 4, wherein said plurality of sensors is selected from the group consisting of laser sensors, ultrasonic sensors, and time-of-flight sensors.

8. The system of claim 4, further comprising a filter configured to filter outputs of said plurality of sensors to remove noise.

9. The system of claim 4, wherein said plurality of sensors comprises overhead sensors.

10. The system of claim 9, wherein said overhead sensors are located under an intersecting bridge or on a highway sign.

11. The system of claim 9, wherein the overhead sensors comprise an array of sensors located over each of one or more road lanes.

12. The system of claim 9, further comprising a correction function performed by the system by which said duration of each of said detection signals is monitored.

13. The system of claim 4, further comprising at least one motion sensor, wherein the plurality of sensors are activated based upon a detected approach of the vehicle by the at least one motion sensor.

14. An overheight road vehicle detection system comprising:
   a detection subsystem comprising at least of two laser sensors located along a road, and wherein at least one of said at least two laser sensors is located on each side of the road such that a signal is emitted from said at least one of said laser sensors on a first side of the road to a second said at least one laser sensor on a second side of the road, creating a pair of sensors having a signal link between them, where the detection subsystem determines a height of a vehicle based at least in part on detection signals output by said at least two laser sensors and if said detection subsystem determines that said height is above a set height value then a duration of said detection signals is monitored; and a warning subsystem coupled to said detection subsystem such that when said signal link is broken, said warning subsystem triggers a warning indicator when said monitored duration is less than a defined threshold.

15. The system of claim 14, wherein at least one pair of sensors is a threshold pair of sensors.

16. The system of claim 14, wherein said at least two laser sensors comprises a plurality of laser sensors located at a first height such that said signal link will be broken by the vehicle passing between said pair of sensors, and at least one pair of sensors located at a second height above said plurality of laser sensors.

17. The system of claim 14, wherein said detection subsystem is configured to differentiate between at least two types of vehicles breaking said signal link simultaneously.

18. A non-transitory computer readable storage medium on which instructions are stored, to be carried out by a processor, that comprise:

a first set of computer instructions comprising a detection subsystem algorithm that processes signals output from a plurality of sensors placed at preselected positions along a road to detect a presence of a vehicle on the road and determine a height of said vehicle, where the detection subsystem algorithm identifies a lane of the road in which said vehicle is present based upon signals output by one or more lateral sensor of said plurality of sensors and then determines for the identified lane if an overheight condition exists for said vehicle by comparing said height to a set height value; and a second set of computer instructions comprising a warning subsystem algorithm that receives an indication from the first set of computer instructions indicating when an overheight vehicle has been detected in said lane based upon said comparison and causes a warning indicator to be triggered.

* * * * *